US008861691B1

(12) United States Patent
De et al.

(10) Patent No.: US 8,861,691 B1
(45) Date of Patent: Oct. 14, 2014

(54) METHODS FOR MANAGING TELECOMMUNICATION SERVICE AND DEVICES THEREOF

(71) Applicant: Wipro Limited, Bangalore (IN)

(72) Inventors: Anindito De, Chennai (IN); Sivakumar Subbiah, Bangalore (IN); Srinivasa Raghava Vegi, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 13/972,630

(22) Filed: Aug. 21, 2013

(30) Foreign Application Priority Data

May 24, 2013 (IN) .......................... 2287/CHE/2013

(51) Int. Cl.
*H04M 15/00* (2006.01)
*H04M 3/42* (2006.01)
*H04M 3/22* (2006.01)
*G06Q 30/00* (2012.01)

(52) U.S. Cl.
CPC .......... *H04M 3/2263* (2013.01); *G06Q 30/016* (2013.01); *H04M 15/41* (2013.01)
USPC ...... 379/111; 379/112.01; 379/126; 379/133; 379/201.01

(58) Field of Classification Search
CPC ............ H04M 15/00; H04M 2242/12; H04M 2203/25; H04M 2203/05; H04M 2203/40; H04M 2203/401; H04M 2203/55; H04W 4/00; H04W 8/00; H04W 16/00; H04W 24/00; H04W 68/00; H04W 20/0215; H04W 28/0231; H04W 28/16; H04W 74/00; H04L 41/02; H04L 41/04; H04L 41/08; H04L 41/14; H04L 41/16; H04L 41/18; H04L 41/22; H04L 41/50

USPC ................. 379/111, 112.01, 112.04, 112.06, 379/114.01, 114.04, 114.12, 114.14, 379/121.01, 121.04, 121.05, 122, 126, 379/265.01, 265.03, 265.13, 266.02, 379/201.01, 201.02, 201.03, 201.04, 379/201.12, 32.01, 133, 134, 138
See application file for complete search history.

(56) References Cited

U.S. PATENT DOCUMENTS

| 6,049,599 | A  | * | 4/2000 | McCausland et al. ........ 379/111 |
| 8,442,512 | B1 | * | 5/2013 | Metters et al. ................ 455/423 |
| 2010/0262487 | A1 |  | 10/2010 | Edwards et al. |
| 2012/0053990 | A1 |  | 3/2012 | Pereg et al. |
| 2012/0142319 | A1 | * | 6/2012 | Joshi et al. ................ 455/414.1 |

OTHER PUBLICATIONS

Yan L., et al., "Optimizing Classifier Performance via an Approximation to the Wilcoxon-Mann-Whitney Statistic", Proceedings of the Twentieth International Conference on Machine Learning (ICML-2003), Washington DC, 2003, pp. 1-8.

(Continued)

*Primary Examiner* — Binh Tieu
(74) *Attorney, Agent, or Firm* — LeClairRyan, a Professional Corporation

(57) ABSTRACT

A method, non-transitory computer readable medium, and a service management computing device comprises obtaining one or more call detail records associated with one or more customers from one or more data sources. Each of the obtained call detail records is scanned to determine presence of a call drop in each of the obtained call detail records. Next, a customer experience index and an impact value is determined for the one or more call detail records for which the call drop is determined to be present. Based on the determined experience index, one or more actions are performed.

21 Claims, 6 Drawing Sheets

(56) References Cited

OTHER PUBLICATIONS

Kar D., "Real-Time Telecom Revenue Assurance", ICDT 2012 : The Seventh International Conference on Digital Telecommunications, pp. 130-135.

Kar A., et al., "A model for bundling mobile value added services using neural networks", Int. J. Applied Decision Sciences, vol. 5, No. 1, 2012, pp. 47-63.

Hassouna M., et al., "Agent Based Modelling and Simulation: Toward a New Model of Customer Retention in the Mobile Market", School of Information Systems, Computing and Mathmatics, SCSC, 2011, pp. 30-35.

Jaroszewicz S., "Cross-selling models for telecommunication services", Journal of the Telecommunications and Information Technology, 2008, pp. 52-59.

Wang Y., et a., "A recommender system to avoid customer churn: A case study", Expert Systems with Applications, ScienceDirect, 2008, pp. 8071-8075.

"ReportLab PDF Library, User Guide", ReportLab Version 2.7, Thornton House, 2013, pp. 1-124.

Yan L., et al., "Predicting Customer Behavior via Calling Links", Proceedings of International Joint Conference on Neural Networks, 2005, IEEE, pp. 2555-2560.

\* cited by examiner

METHODS FOR MANAGING TELECOMMUNICATION SERVICE AND DEVICES THEREOF

This application claims the benefit of Indian Patent Application Filing No. 2287/CHE/2013, filed May 24, 2013, which is hereby incorporated by reference in its entirety.

FIELD

This technology generally relates to telecommunication service, more particularly, to methods for managing call, data and messages in telecommunication service and devices thereof.

BACKGROUND

Telecommunication service is a service provided to a group of users by telecommunication provider. In the current scenario, telecommunication service providers globally are faced with stiff challenges to sustain service revenues. Major improvements in tele-density have meant reduced opportunity to find new customers. High customer acquisition costs in developed markets along with high proportion of post-paid subscribers and regulations like mobile number portability have made providers highly vulnerable to loss in revenue due to attrition of subscribers. These market conditions have made providers highly focused to improve net life time value of existing customers. The net life time value is again dependent on customer life expectancy and customer wallet share of mobile telecommunication services for the provider. Customer Life Expectancy in turn is dependent on customer experience index.

Existing technologies have loyalty based programs, model to predict likelihood of a customer to respond to service offers based on past data. Unfortunately, existing technologies fail to determine the changes in customer experience index and usage patterns as they occur in near real time and then provide services based on the impact of these changes.

SUMMARY

A method for managing telecommunication service includes a service management computing device obtaining one or more call detail records associated with one or more customers from one or more data sources. Each of the obtained call detail records are scanned by the service management computing device to determine presence of a call drop in each of the obtained call detail records. A customer experience index and an impact value is determined by the service management computing device for the one or more call detail records for which the call drop is determined to be present. Based on the determined experience index, one or more actions are performed by the service management computing device.

A non-transitory computer readable medium having stored thereon instructions for managing telecommunication service comprising machine executable code which when executed by at least one processor, causes the processor to perform steps including obtaining one or more call detail records associated with one or more customers from one or more data sources. Each of the obtained call detail records is scanned to determine presence of a call drop in each of the obtained call detail records. Next, a customer experience index and an impact value is determined for the one or more call detail records for which the call drop is determined to be present. Based on the determined experience index, one or more actions are performed.

A service management computing device comprising one or more processors, a memory, wherein the memory coupled to the one or more processors which are configured to execute programmed instructions stored in the memory including obtaining one or more call detail records associated with one or more customers from one or more data sources. Each of the obtained call detail records is scanned to determine presence of a call drop in each of the obtained call detail records. Next, a customer experience index and an impact value is determined for the one or more call detail records for which the call drop is determined to be present. Based on the determined experience index, one or more actions are performed.

This technology provides a number of advantages including managing call service using customer experience index, a future behavior of the customer and an impact value of the customer. Additionally, by using this technology, the telecommunication service provider can manage to retain their customers either by providing remedial actions or providing up-selling offers in real-time thereby enhancing the revenue of the telecommunication service provider.

DETAILED DESCRIPTION

Figure 1:
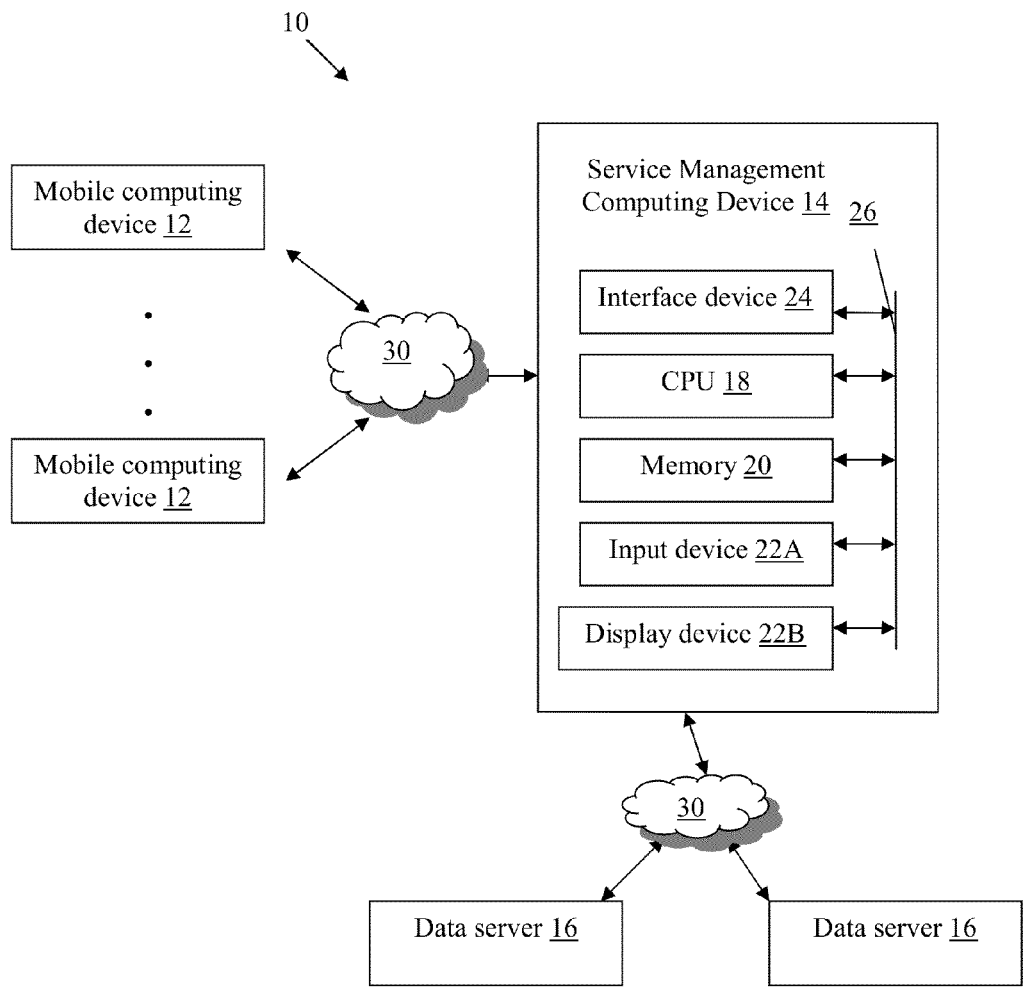
FIG. 1 is a block diagram of an exemplary environment with a service management computing device for managing call service.

An exemplary environment 10 with a service management computing device 14 for managing call service is illustrated in FIG. 1. The exemplary environment 10 includes plurality of mobile computing devices 12, the service management computing device 14, and data servers 16 which are coupled together by a communication network 30, although the environment can include other types and numbers of devices, components, elements, and communication networks 30 in other topologies and deployments. While not shown, the exemplary environment 10 may include additional components, such as database etc, which are well known to those of ordinary skill in the art and thus will not be described here. This technology provides a number of advantages including providing more effective methods, non-transitory computer readable medium and devices for managing call service.

Referring more specifically to FIG. 1, the service management computing device 14 is coupled to mobile computing devices 12 through the communication network 30, although the mobile computing devices 12 and service management computing device 14 may be coupled together via other topologies. As it would be appreciated by a person having ordinary skill in the art, the communication network 30 can include one or more of mobile networks, local area network (LAN) or a wide area network (WAN), although the communication network 30 can include other topologies. Additionally, the service management computing device 14 is coupled to the data servers through the communication network 30, although the service management computing device 14 and data servers may be coupled together via other topologies.

The service management computing device 14 assists with managing a service call as illustrated and described with the examples herein, although service management computing device 14 may perform other types and numbers of functions. The service management computing device 14 includes at least one CPU/processor 18, memory 20, input device 22A and display device 22B, and interface device 24 which are coupled together by bus 26, although service management computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 3A:
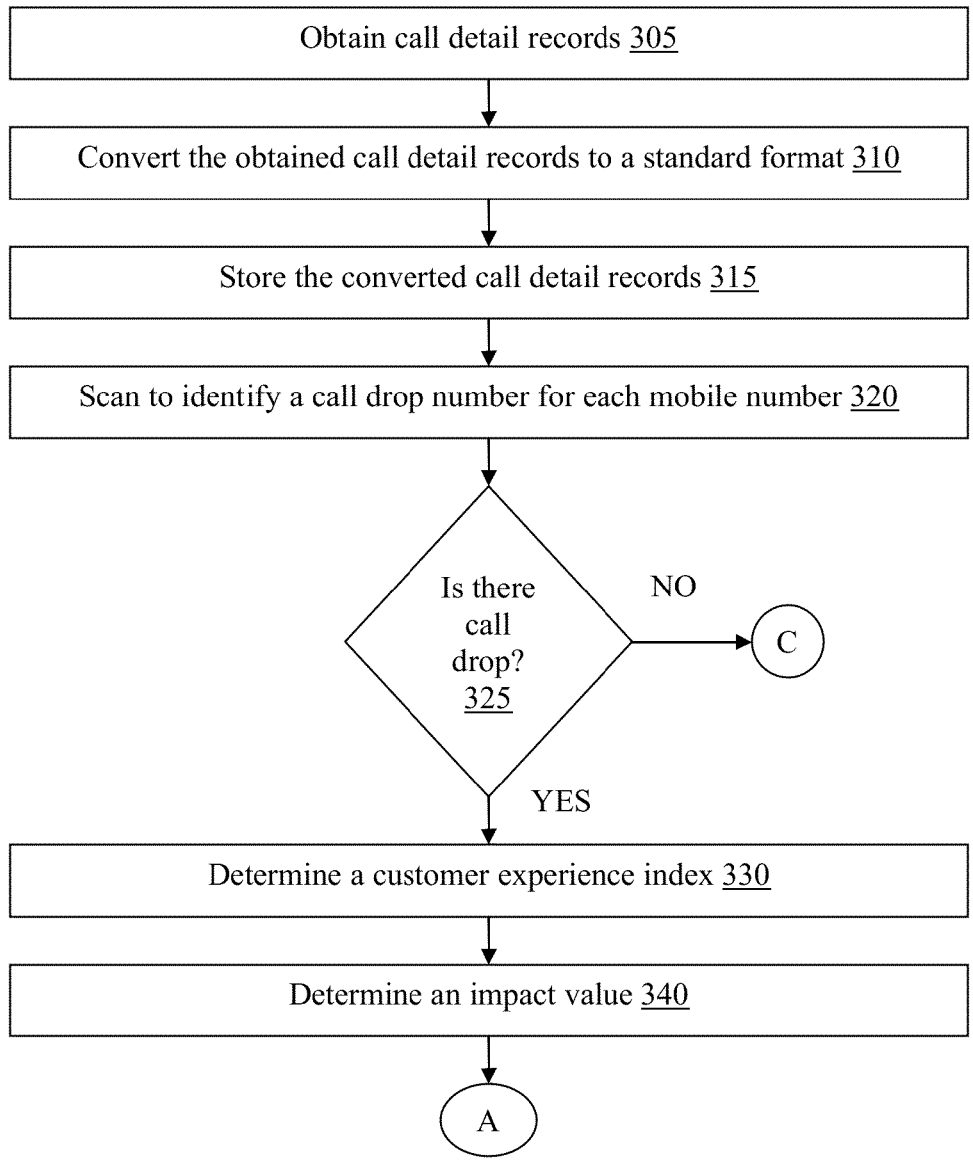
FIGS. 3A-3B are flowcharts of an exemplary method for managing call service.
Figure 3B:
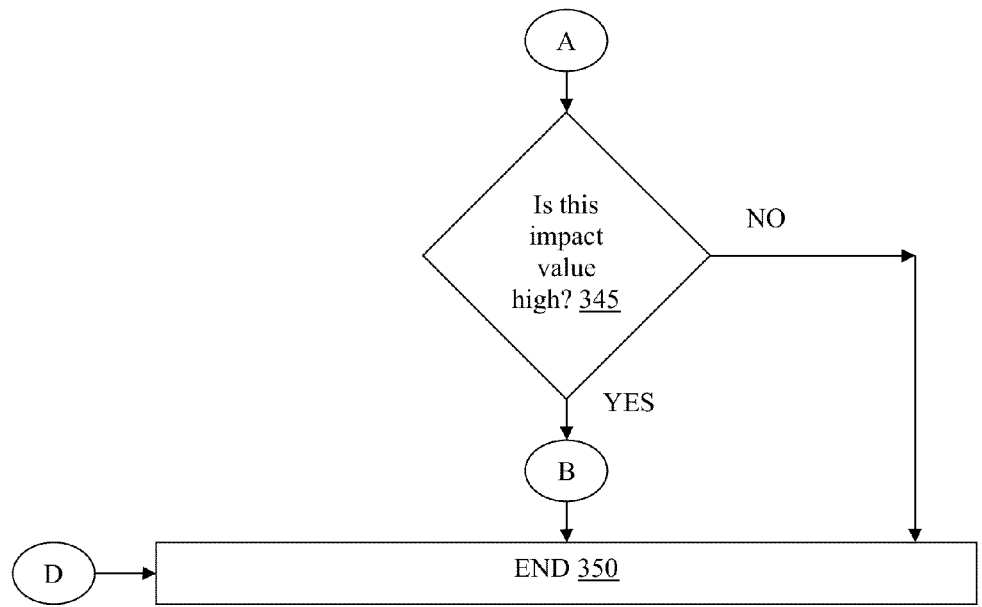
Figure 4:
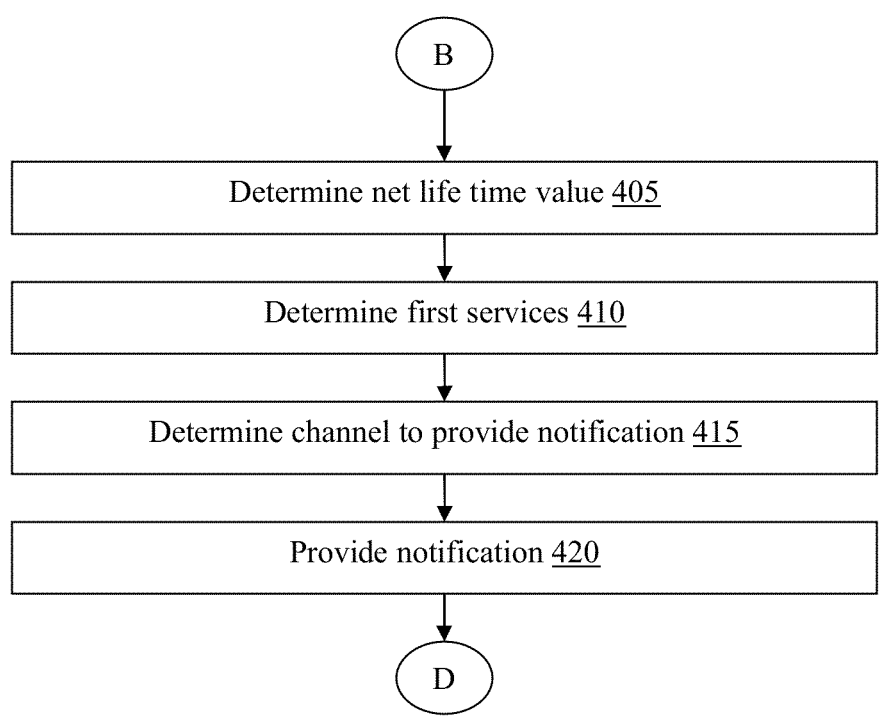
FIG. 4 is an exemplary flowchart for identifying and providing first services.
Figure 5:
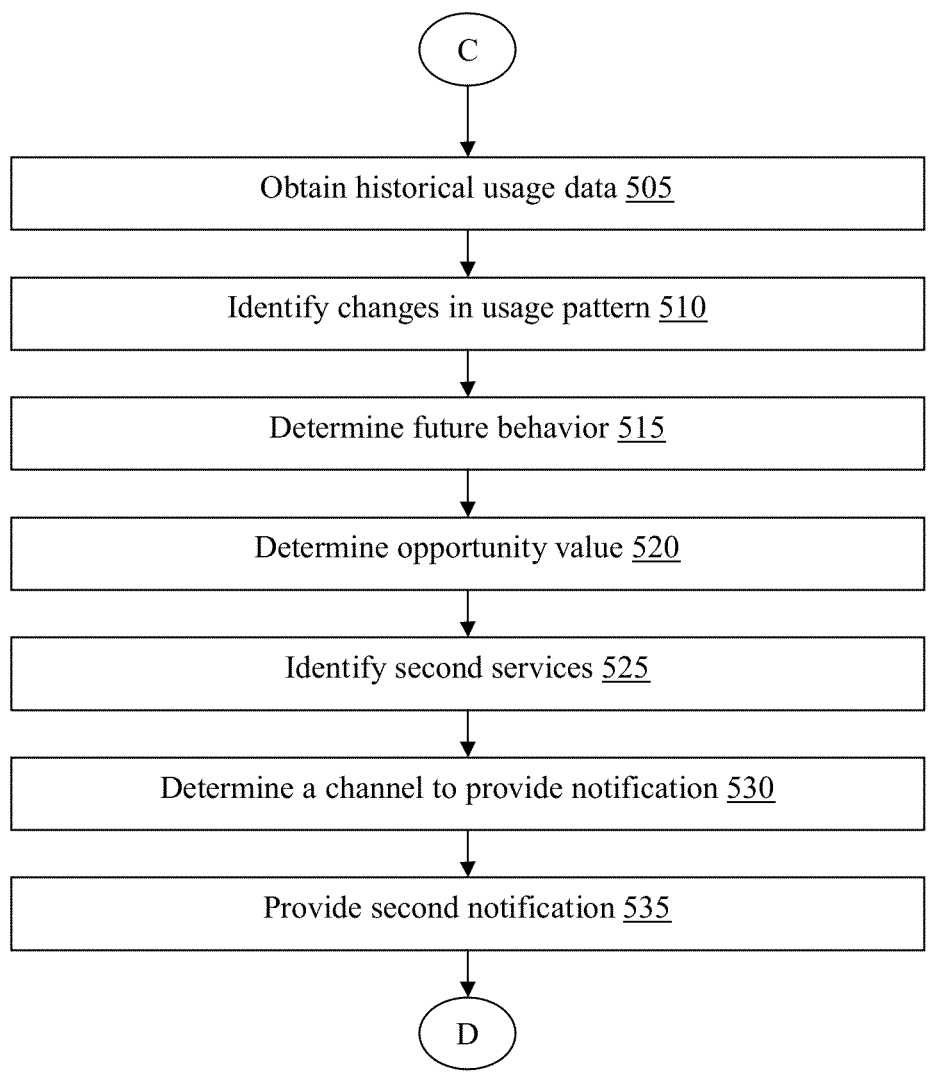
FIG. 5 is an exemplary flowchart for identifying and providing second services.

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 3-5 is representative of example steps or actions of this technology that may be embodied or expressed as one or more non-transitory computer or machine readable instructions stored in memory 20 that may be executed by the processor(s) 18.

Figure 2:
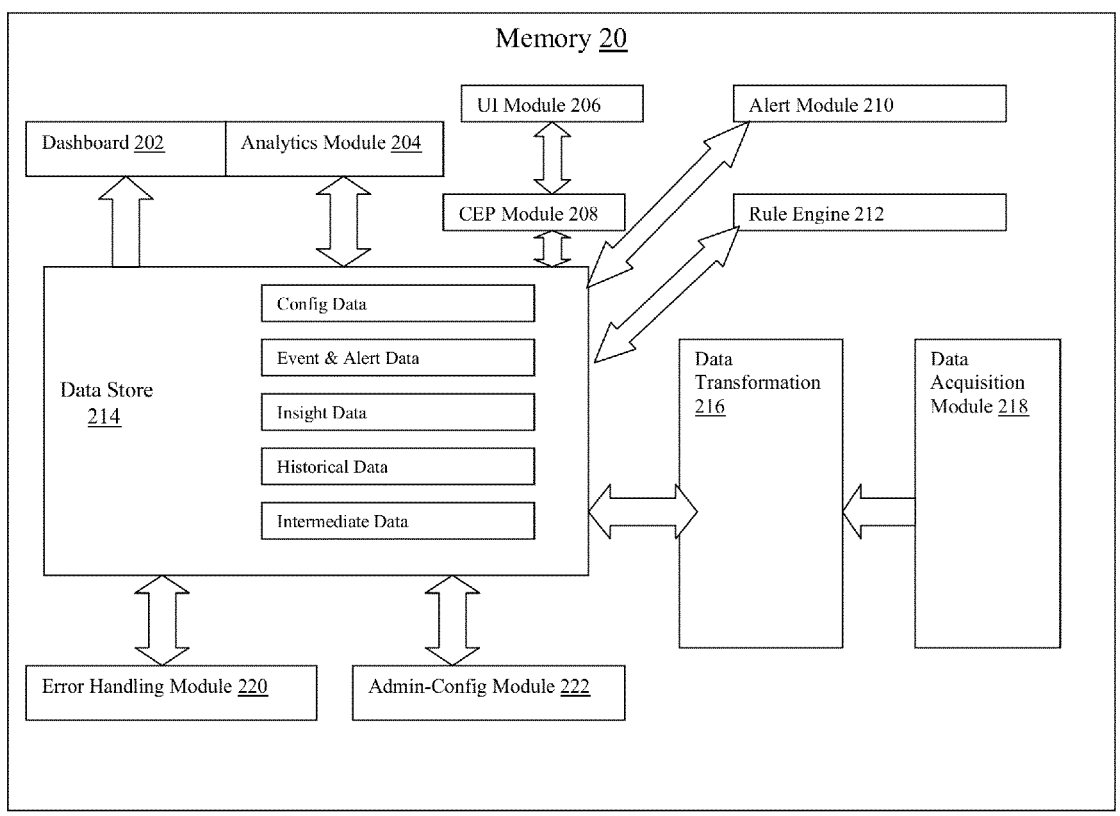
FIG. 2 is an exemplary functional block diagram of a plurality of modules present within a memory of the service management computing device.

As illustrated in FIG. 2, memory 20 includes a dashboard module 202, an analytics module 204, user interface module 206, CEP module 208, alert module 210, rule engine 212, a data store 214, data transformation module 216, a data acquisition module 218, error handling module 220 and an administration-configuration module 222. The dashboard module 202 assists with displaying information about business activities, user-transactions or related insights, although the dashboard module 202 can provide and/or assist with other types and numbers of functions and/or operations. Next, the analytics module 204 assists with statistical modeling of historical data of call records to generate scores for predicted future behavior of subscribers, although the analytics module can provide and/or assist with other types and numbers of functions and/or operations.

Further, the user interface (UI) module 206 assists with providing interfaces to authorized users of the service management computing device, although the UI module can provide and/or assist with other types and numbers of functions and/or operations. The CEP module 208 assists with implementing the business rules across data feeds from different sources through the rule engine 212 to detect event patterns and generate response alerts, although the CEP module 208 can provide and/or assist with other types and numbers of functions and/or operations.

The alert module 210 assists with collecting alerts and propagating them into identified channels for processing, although the alert module 210 can provide and/or assist with other types and numbers of functions and/or operations. In this example, the rule engine 212 assists with executing a defined set of business rules and validates rules as part of rules management function, although the rule engine 212 can provide and/or assist with other types and numbers of functions and/or operations.

Next, the data store 214 assists with storing of different data used and produced by rest of the modules in the memory 20, although the data store can store other types of data and other information and/or instructions. Additionally, as illustrated in FIG. 2, the data store 214 also assists with storing configuration-data, event & alert-data, insight-data, historical-data, and intermediate-data in the memory 20. By way of example only, configuration data can relate to information about customer including social and demographic aspects, services-specs, marketing-campaigns, references and thresholds, although the configuration data can comprise other types of data. Next, the event and alert data present in the data store 214 relates to events that are detected during processing of external data by the service management computing device 14. The insight data in the data store 214 includes intelligent information created for decision making by the CEP module 208 and other modules, although the insight data can comprise other types of data. In this example, the insight data is generated by the analytics module 204 and CEP module 208 by analyzing configuration-data, event & alert-data, historical-data, intermediate-data and existing insight-data, although the data can be generated and/or obtained in other manners. The historical data in the data store 214 assists with archiving of all past data including configuration-data, event & alert-data, intermediate-data and existing insight-data, although the historical data can comprise other types of data.

The data transformation module 216 assists with transforming of data from the data servers 16 into a standard format, although the data transformation module 216 can provide and/or assist with other types and numbers of functions and/or operations. By way of example only, first the data can be obtained from the data server 16 in raw data from equipment specific binary or ASN. 1 formats to actionable formats. Next data cleansing is performed on the transformed data, where cleansing includes, validating data, normalizing certain attributes in call data, implementing stitching of partial calls to produce complete records and then filtering unwanted data. The cleansed data is enriched by aggregating and enhancing data from diverse sources like network nodes, customer, billing, or analytical models.

The data acquisition module 218 assists with obtaining call data records from the data servers 16 in near real time basis, although the data acquisition module 218 can collect the data from other sources. Additionally, while obtaining the call data records, the data are initially is compressed and then decompressed during the transfer process for high data transfer performance.

The error handing module 220 assists with identifying and handling the errors, although the error handling module 220 can perform other types and numbers of functions and/or other operations.

Next the administrator-configuration (admin-config) module 222 assists with maintaining configuration data. In this example, the configuration information is obtained from authorized persons through the UI module 206, although the configuration information can be obtained using other techniques. In another example, configuration information can be obtained from the incoming external data such as a CRM data. In yet another example, a set of configuration information, such as threshold values (ex. thresholds) can be automatically adjusted by administrator-configuration module 222 using existing insight-data, although configuration information can be obtained and/or generated in other manners.

Input device 22A enables a user, such as an administrator, to interact with the service management computing device, such as to input and/or view data and/or to configure, program and/or operate it by way of example only. By way of example only, input device 22A may include one or more of a touch screen, keyboard and/or a computer mouse.

The display device 22B enables a user, such as an administrator, to interact with the service management computing device, such as to input and/or view data and/or to configure, program and/or operate it by way of example only. By way of example only, the display device may include one or more of a CRT, LED monitor, or LCD monitor, although other types and numbers of display devices could be used.

The interface device 24 in the service management computing device 14 is used to operatively couple and communicate between the service management computing device 14, the mobile computing devices 12, and the data server 16 over communication networks 30, although other types and numbers of systems, devices, components, elements and/or networks with other types and numbers of connections and configurations can be used. By way of example only, the communication network 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other types of buses and/or other links may be used, such as PCI.

Each of the mobile computing devices 12 and the data servers 16 include a central processing unit (CPU) or processor, a memory, an interface device, input device and display device, which are coupled together by a bus or other link, although each could have other types and numbers of elements and/or other types and numbers of network devices could be used in this environment. The mobile computing device 12, in this example, may run interface applications that may provide an interface to receive notification from the service management computing device 14. Additionally, each of the data servers 16 may receive data from the requests or may send data in response to the request from the service management computing device 14, although each of the plurality of servers 16 may perform other functions. In this example, the data servers 16 includes call detail records information associated with the mobile computing devices 12, although the data servers 16 can include other amounts and types of information.

It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for managing telecommunication service will now be described with reference to FIGS. 1-5. This example begins at step 305 where the service management computing device 14 obtains the call detail records for the mobile computing device 12 associated with a mobile number of a customer from one of the data server 16, although the service management computing device can obtain the call detail records from other locations. In this example, the format of the obtained call detail records is ASN. 1 format or equipment specific binary format, although the call detail records can be in other formats.

Additionally, in this example, the service management computing device 14 compresses the call detail records present at the data server 16 prior to obtaining the call detail records. After obtaining the call detail records, the service management computing device 14 decompresses the compressed call detail records. By compressing and decompressing, the technology in this example provides advantages of faster transmission of large amounts of data.

In step 310, the service management computing device 14 converts the obtained call detail records to a standard format (or actionable format), such as textual or numeric format by way of example only, although the service management computing device 14 can convert the obtained call detail records to other formats.

Additionally, while converting the data from a native format to the standard format, the service management computing device 14 cleans the obtained call detail records by identifying partial call detail records in the obtained call detail records. The service management computing device links the identified partial call detail records to form a complete call record. Once the service management computing device 14 cleans the obtained call detail records, the service management computing device 14 converts the call detail records from a native format of the equipment to a standard format as previously illustrated.

Next, in step 315, the service management computing device 14 stores the converted call detail records in memory 20, although the service management computing device 14 can store the converted call detail records in other locations.

In step 320, the service management computing device 14 scans the converted call detail records stored in the memory 20 to identify call profile parameters such as, dropped call information for all the converted call detail records, for each of the mobile computing devices 12, although the service management computing device 14 can identify other amounts of other information within the converted call detail records. The call drop information relates to the number of times call was undesirably disconnected for a mobile number associated with a customer.

Additionally, in step 320, the service management computing device 14 identifies the all the customer information for each of the mobile computing devices 12 associated with the call drop such as the social and demographic attributes of the customer, subscription plan of the customer, service usage pattern, planned service quality information, a customer segment information, a nature of a call drop or severity of the call drop, although the service management computing device can identify other types and amounts of other information associated with customer of mobile number having call drops.

Next, in step 325, the service management computing device 14 determines for any identified call drop. If the service management computing device 14 determines that there is no call drop, a No branch is taken to step 505 which is later illustrated with reference to FIG. 5. However, if the service management computing device 14 determines that there is a call drop, then a Yes branch is taken to step 330.

In step 330, the service management computing device 14 determines a customer experience index in real-time for each customer of the mobile computing device 12 based on the previously obtained call profile parameters, such as frequency of call drops and other parameters associated with the customer of the mobile number, such as a planned service quality information, a customer segment information, a nature of a call drop or severity of the call drop, although the service management computing device 14 can determine the customer experience index using other parameters. In this example, the service management computing device 14 determines the customer experience index for all call detail records having a call drops. By way of example only, if the frequency of call drop is low based on a comparison against a stored low threshold number, then the severity of call drop is low and the customer satisfaction level is high, then the customer experience index is high. However, if the frequency of call drop is high based on a comparison against a stored high threshold number, the severity of call drop is also high and the customer satisfaction level is low, then the customer experience index is low.

In step 340, the service management computing device 14 determines an impact value for the determined customer experience index value for each of the customer of the mobile computing device 12 based on the previously identified or obtained parameters such as customer segment, history of response to previously offered services, although the service management computing device 14 can determine the impact value using other parameters. In this example, the service management computing device 14 determines the impact value for all call detail records having the call drop.

By way of example only, if the customer segment indicates this is a preferred customer, then the impact value will be high score (for example 4 out of 5 or higher, where the scale is from 0 to 5, 0 being the least and 5 being the highest). In this example, the customer segment in this example relates to a classification of the customer into segments based on the customer historical billing amounts, currently using services, although the customer may be classified into different segments based on other parameters. By way of example only, if the previous billing amounts of the customer is above a certain threshold (for example $150 per month) and if the customer is currently using more than three services, then the customer would be classified as a preferred customer. Continuing with the illustration of step 340, in this example, the higher the impact value is then the higher necessity for the service provider to take one or more actions to retain the customer. Alternatively, if the customer segment is not classified as a preferred customer, then the impact value might be low score (for example 1 out of 5, where the scale is from 0 to 5, 0 being a low score and 5 being the high score).

Additionally in step 340, the service management computing device 14 can determine a future behavior for each of the customer of the mobile computing device 12 by correlating the customer experience index determined in previous step with a stored predicted customer behavior, although the service management computing device can determine the future behavior of each of the customer using other methods or techniques. In this example, the future behavior of the customer is one of likelihood to continue the service, undecided or likelihood to discontinue the service within a particular timeframe, although the future behavior can be other decisions which could be taken by the customer of the mobile computing device 12. By way of example only, if the customer experience index is a high score (for example 4 out of 5 or higher, where the scale is from 0 to 5, 0 being the lowest value and 5 being the highest value), then the predicted customer behavior will be a likelihood to continue the service and accordingly the future behavior of the customer is will be a likelihood to continue the service. However, if the customer experience index is low score (for example 2 out of 5 or lower, where the scale is from 0 to 5, where 0 is the lowest value and 5 is the highest value), then the predicted customer behavior is likelihood to discontinue the service and accordingly the future behavior of the customer is likelihood to discontinue the service. Additionally, the service management computing device 14 can obtain historical data, such as previously stored customer experience index, the customer segment information, a customer behavior threshold from the data server 16 and the obtained historical data can be used to predict the future behavior of the customer.

Accordingly, the service management computing device 14 can use the determined future behavior to determine the impact value, although the service management computing device 14 can determine the impact value using other parameters. By way of example only, if the future behavior of the customer indicates a likelihood to discontinue the service and the customer segment indicates this is a preferred customer, then the impact value will be high score (for example 4 out of 5 or higher, where the scale is from 0 to 5, 0 being the least and 5 being the highest). Additionally, if the future behavior of the customer indicates likelihood to continue the service and if the customer segment is not classified as a preferred customer, then the impact value might be low score (for example, 1 out of 5).

In step 345, the service management computing device 14 performs one or more actions by determining if the previously determined impact value is a high score (for example 4 out of 5). If the service management computing device 14 determines that the impact value is not a high score, the exemplary process takes a No branch to end in step 350. However, if the service management computing device 14 determines that the impact value is a high score, a Yes branch is taken to step 405 illustrated in FIG. 4.

In step 405, the service management computing device 14 determines a net life time value of the customer of the mobile computing device 12 using parameters such as customer segments, social and demographic attributes of the customer, service usage pattern or historical billing data for all call detail records having the call drop, although the service management computing device can determine the net life time value of the customer using other parameters. In step 410, the service management computing device 14 determines first services (or remedial actions) for the customer of the mobile computing device 12 based on the net life time value and the impact value for all call detail records having the call drop, although the service management computing device 14 can determine the first services based on other parameters. By way of example only, the first services can be commercial discounts on the bill or other remedial offers. In step 415, the service management computing device 14 determines a first channel to provide notification to the customer of the mobile computing device 12 based on the customer segment or the determined first services, although the service management computing device 14 can determine the first channel using other parameters. By way of example only, the channels can be one or more of, a text message, or an email or an automated call. Next, in step 420, the service management computing device 14 provides a notification to the mobile number of the customer of the mobile computing device 12 indicating the availability of the commercial offers discounts on the bill for all call detail records having the call drop, although the service management computing device 14 can provide the notification to the customer using other methods or techniques and the exemplary process ends in step 350.

Back in step 325, if the service management determined that there is no call drop, then the exemplary process flows to step 505 of FIG. 5. In step 505, the service management computing device 14 obtains historical usage data and the current usage pattern of the customer of the mobile computing device 12 from one of the data server 16 for call detail records not having a call drop, although the service management computing device may obtain other information from the data server 16. Next, in step 510, the service management computing device 14 identifies changes in the historical usage pattern and the current usage pattern of the customer of the mobile computing device 12 for call detail records not having call drops. In this example, changes in the usage pattern relates to difference in usage of minutes in voice calls, amount of text messages sent, the amount of internet used, or change in the geographical location of the customer of the mobile computing device 12, although the changes in the usage pattern can relate to other information. In step 515, the service management computing device 14 determines the future behavior of the customer of the mobile computing device 12 in terms to predict the usage pattern of the customer using the identified changes for call detail records not having call drops, although the service management computing device 14 can determine the future behavior of the customer using other parameters. By way of example only, the future behavior can be will send more text messages, or will make long distance calls, or increased usage of internet, although the future behavior can be other behaviors of the customer. In step 520, the service management computing device 14 determines an opportunity value of the future behavior of the customer of the mobile computing device 12 using the customer segment and the determined future behavior in the previous step for call detail records not having call drop, although the service management computing device 14 can determine the opportunity value using other parameters. In this example, the future behavior of the customer can be likelihood to increase text message, likelihood to increase internet usage or likelihood to increase use of long distance calls. By way of example only, the opportunity value is high score (for example 4 out of 5 on a scale of 0 to 5, where 0 is the lowest value and 5 is the highest value) if the customer is a preferred customer. Next, in step 525, the service management computing device 14 identifies second services in real-time (up-selling services or cross selling services) for the customer of the mobile computing device 12 based on the future behavior and the impact value for call detail records not having call drop, although the service management computing device 14 can identify the second service using other parameters. By way of example only, if the future behavior of the customer has likelihood to increase internet usage and the impact value is high score, the second service identified by the service management computing device 14 can be to offer additional internet usage plan, although the service management computing device 14 can identify other second services to the customer. In step 530, the service management computing device 14 determines a channel to provide a second notification to the customer of the mobile computing device 12 using technique illustrated in step 415. In step 535, the service management computing device 14 provides the second notification to the customer of the mobile computing device 12 on the availability of the second service using techniques previously illustrated in step 420 for call detail records not having call drop and the exemplary process ends in step 350.

Accordingly, as illustrated and described with the examples herein, this technology provides a number of advantages including managing call service using customer experience index, a future behavior of the customer and an impact value of the customer. Additionally, by using this technology, the telecommunication service provider can manage to retain their customers either by providing remedial actions or providing up-selling offers in real-time thereby enhancing the revenue of the telecommunication service provider.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing telecommunication service, the method comprising:
   obtaining, by a service management computing device, one or more call detail records associated with one or more customers from one or more data sources;
   scanning, by the service management computing device, each of the obtained call detail records to determine presence of a call drop in each of the obtained call detail records;
   determining, by the service management computing device, a customer experience index and an impact value for the one or more call detail records for which the call drop is determined to be present, wherein the impact value is determined based on at least a response to previously offered service; and
   performing, by the service management computing device, one or more actions based on the determined customer experience index, or the impact value.

2. The method as set forth in claim 1 further comprising:
   converting by the service management computing device the retrieved one or more call detail records to a standard format; and
   storing by the service management computing device the converted one or more call detail records.

3. The method as set forth in claim 1 wherein the performing further comprises determining by the service management computing device when the determined impact value is above a stored high score value.

4. The method as set forth in claim 3 further comprising providing by the service management computing device a first notification of availability of one or more first services to a mobile computing device associated with the one or more call detail records having the determined impact value above the stored high score value.

5. The method as set forth in claim 4 wherein the providing further comprises:
   determining by the service management computing device a net life time value of a customer;
   determining by the service management computing device the one or more first services based on the determined net life time value;

determining by the service management computing device a first channel to provide the first notification to the customer based on the determined one or more first services; and providing by the service management computing device the first notification indicating availability of the determined first one or more services via the determined first channel.

6. The method as set forth in claim 1 wherein the scanning further comprises providing by the service management computing device a second notification of availability of the identified one or more second services when the call drop is determined not to be present in each of the one or more call detail records.

7. The method as set forth in claim 6 wherein the providing further comprises:

obtaining by the service management computing device one or more historical usage data of the one or more customers;

identifying by the service management computing device one or more changes to a usage pattern in the obtained one or more historical usage data;

determining by the service management computing device a future behavior and an opportunity value based on the identified one or more changes;

determining by the service management computing device the one or more second services based on the determined future behavior and the opportunity value;

determining by the service management computing device a second channel to provide the second notification to the customer based on the determined one or more second services; and providing by the service management computing device the second notification indicating availability of the determined second one or more services via the determined second channel.

8. A non-transitory computer readable medium having stored thereon instructions for managing telecommunication service comprising machine executable code which when executed by at least one processor, causes the processor to perform steps comprising:

obtaining one or more call detail records associated with one or more customers from one or more data sources;

scanning each of the obtained call detail records to determine presence of a call drop in each of the obtained call detail records;

determining a customer experience index and an impact value for the one or more call detail records for which the call drop is determined to be present, wherein the impact value is determined based on at least a response to a previously offered service; and performing one or more actions based on the determined customer experience index, or the impact value.

9. The medium as set forth in claim 8 further comprising:

converting the retrieved one or more call detail records to a standard format; and storing the converted one or more call detail records.

10. The medium as set forth in claim 8 wherein the performing further comprises determining when the determined impact value is above a stored high score value.

11. The medium as set forth in claim 10 further comprising providing a first notification of availability of one or more first services to a mobile computing device associated with the one or more call detail records having the determined impact value above the stored high score value.

12. The medium as set forth in claim 11 wherein the providing further comprises:

determining a net life time value of a customer;

determining the one or more first services based on the determined net life time value;

determining a first channel to provide the first notification to the customer based on the determined one or more first services; and providing the first notification indicating availability of the determined first one or more services via the determined first channel.

13. The medium as set forth in claim 8 wherein the scanning further comprises providing a second notification of availability of the identified one or more second services when the call drop is determined not to be present in each of the one or more call detail records.

14. The medium as set forth in claim 13 wherein the providing further comprises:

obtaining one or more historical usage data of the one or more customers;

identifying one or more changes to a usage pattern in the obtained one or more historical usage data;

determining a future behavior and an opportunity value based on the identified one or more changes;

determining the one or more second services based on the determined future behavior and the opportunity value;

determining a second channel to provide the second notification to the customer based on the determined one or more second services; and providing the second notification indicating availability of the determined second one or more services via the determined second channel.

15. A service management computing device comprising:

one or more processors;

a memory, wherein the memory coupled to the one or more processors which are configured to execute programmed instructions stored in the memory comprising:

obtaining one or more call detail records associated with one or more customers from one or more data sources;

scanning each of the obtained call detail records to determine presence of a call drop in each of the obtained call detail records;

determining a customer experience index and an impact value for the one or more call detail records for which the call drop is determined to be present, wherein the impact value is determined based on at least a response to a previously offered service; and performing one or more actions based on the determined customer experience index, or the impact value.

16. The device as set forth in claim 15 wherein the one or more processors is further configured to execute programmed instructions stored in the memory for the performing further comprises determining when the determined impact value is above a stored high score value.

17. The device as set forth in claim 16 wherein the one or more processors is further configured to execute programmed instructions stored in the memory further comprising:

converting the retrieved one or more call detail records to a standard format; and storing the converted one or more call detail records.

18. The device as set forth in claim 16 wherein the one or more processors is further configured to execute programmed instructions stored in the memory further comprising providing a first notification of availability of one or more first services to a mobile computing device associated with the one or more call detail records having the determined impact value above the stored high score value.

19. The device as set forth in claim 18 wherein the one or more processors is further configured to execute programmed instructions stored in the memory for the providing further comprises:
- determining a net life time value of a customer;
- determining the one or more first services based on the determined net life time value;
- determining a first channel to provide the first notification to the customer based on the determined one or more first services; and
- providing the first notification indicating availability of the determined first one or more services via the determined first channel.

20. The device as set forth in claim 15 wherein the one or more processors is further configured to execute programmed instructions stored in the memory for the scanning further comprises providing a second notification of availability of the identified one or more second services when the call drop is determined not to be present in each of the one or more call detail records.

21. The device as set forth in claim 20 wherein the one or more processors is further configured to execute programmed instructions stored in the memory for the providing further comprises:
- obtaining one or more historical usage data of the one or more customers;
- identifying one or more changes to a usage pattern in the obtained one or more historical usage data;
- determining a future behavior and an opportunity value based on the identified one or more changes;
- determining the one or more second services based on the determined future behavior and the opportunity value;
- determining a second channel to provide the second notification to the customer based on the determined one or more second services; and
- providing the second notification indicating availability of the determined second one or more services via the determined second channel.

\* \* \* \* \*